United States Patent
Moriwaki et al.

(10) Patent No.: US 6,867,783 B2
(45) Date of Patent: Mar. 15, 2005

(54) RECORDING MEDIUM HAVING RECORDED THEREON THREE-DIMENSIONAL GRAPHICS DRAWING DATA HAVING DATA STRUCTURE SHAREABLE BY FRAMES AND METHOD OF DRAWING SUCH DATA

(75) Inventors: Shohei Moriwaki, Hyogo (JP);
Yoshifumi Azekawa, Hyogo (JP);
Osamu Chiba, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 204 days.

(21) Appl. No.: 09/778,782

(22) Filed: Feb. 8, 2001

(65) Prior Publication Data

US 2001/0026280 A1 Oct. 4, 2001

(30) Foreign Application Priority Data

Mar. 31, 2000 (JP) .................................... 2000-098258

(51) Int. Cl.[7] .......................... G06F 1/00; G06F 13/00; G06F 12/00; G06F 9/34
(52) U.S. Cl. ...................... 345/536; 345/537; 345/522; 345/501; 345/531; 345/564; 711/171; 711/221
(58) Field of Search ............................... 345/418–422, 345/501, 502, 522, 530, 536, 537, 538, 558, 559, 564, 565, 581, 589, 601, 619, 532, 534, 531; 711/3, 203, 111–112, 108, 168, 207, 212, 221, 170–173; 712/204, 216

(56) References Cited

U.S. PATENT DOCUMENTS

| | | | | |
|---|---|---|---|---|
| 5,144,679 A | * | 9/1992 | Kakumoto et al. .......... | 382/113 |
| 5,151,974 A | * | 9/1992 | Tani et al. ................... | 345/428 |
| 5,182,797 A | * | 1/1993 | Liang et al. ................. | 345/522 |
| 5,493,679 A | * | 2/1996 | Virgil et al. ................. | 707/104.1 |
| 5,596,691 A | * | 1/1997 | Good et al. ................. | 345/440 |
| 5,619,629 A | * | 4/1997 | Yutaka ....................... | 345/421 |
| 6,094,193 A | * | 7/2000 | Katsura et al. ............. | 345/213 |
| 6,157,398 A | * | 12/2000 | Jeddeloh ..................... | 345/532 |
| 6,560,688 B1 | * | 5/2003 | Strongin et al. ............ | 711/203 |
| 6,622,237 B1 | * | 9/2003 | Keller et al. ................ | 712/216 |
| 6,629,188 B1 | * | 9/2003 | Minkin et al. ................ | 711/3 |
| 6,636,959 B1 | * | 10/2003 | Keller et al. ................ | 712/204 |

FOREIGN PATENT DOCUMENTS

| | | |
|---|---|---|
| CN | 1114762 A | 1/1996 |
| JP | 6-203170 | 7/1994 |
| JP | 6-259574 | 9/1994 |
| JP | 10-500512 | 1/1998 |

* cited by examiner

Primary Examiner—Matthew C. Bella
Assistant Examiner—Wesner Sajous
(74) Attorney, Agent, or Firm—McDermott Will & Emery LLP

(57) ABSTRACT

A data table includes a source pointer indicating a starting address of drawing data, a destination pointer indicating a destination of drawing data to be transferred, and a data length indicating a data length of drawing data to be transferred. Data table may indicate drawing data to be drawn. Thus frames may share drawing data. As such the amount of drawing data can be reduced.

14 Claims, 3 Drawing Sheets

RECORDING MEDIUM HAVING RECORDED THEREON THREE-DIMENSIONAL GRAPHICS DRAWING DATA HAVING DATA STRUCTURE SHAREABLE BY FRAMES AND METHOD OF DRAWING SUCH DATA

BACKGROUND OF THE INVENTION

1. Field of the Invention

The present invention relates generally to techniques for drawing three-dimensional (3D) graphics and particularly to recording media having recorded thereon 3D graphics drawing data shareable by frames and thus drawn and methods of drawing such data.

2. Description of the Background Art

In recent years, 3D graphics drawing devices rapidly processing 3D images have been increasingly developed for personal computers, video game machines and the like to provide fine images of visual realism. A conventional 3D graphics drawing device requires that a coordinate or the like of a drawing primitive be obtained for each frame by means of a geometric operation.

Rapidly calculating a primitive's coordinate or the like requires providing a 3D graphics drawing device with a geometric-operation unit expensive and highly capable of performing a geometric operation. This disadvantageously increases the cost of the 3D graphics drawing device.

A 3D graphics drawing device may dispense with such an expensive geometric-operation unit and instead the data of a vertex of a polygon that is previously processed through a geometric operation, such as vertex coordinate data, color data, transmittance data, texture mapping coordinate data, and stored in an external memory may be drawn for each frame to draw a primitive. In this arrangement, however, each frame needs to have drawing data for the primitive. This disadvantageously requires an external memory having a enormous storage capacity.

SUMMARY OF THE INVENTION

The present invention contemplates a recording medium having recorded thereon 3D graphics drawing data capable of reducing the amount of such data required.

The present invention also contemplates a drawing method capable of reducing the amount of 3D graphics drawing data required.

The present invention in one aspect provides a computer-readable recording medium, including a plurality of graphics drawing data and a data table indicating in the plurality of graphics drawing data the graphics drawing data to be transferred. The data table includes a source pointer indicating a starting address of drawing data, a destination pointer indicating a destination of the graphics drawing data to be transferred, and a data length indicating a data length of the graphics drawing data to be transferred.

Since the data table may indicate the graphics drawing data to be transferred, frames may share the graphics drawing data. Thus the amount of the graphics drawing data may be reduced.

The present invention in another aspect provides a method of successively drawing desired drawing data of a plurality of drawing data, including the steps of: reading drawing data from a starting address of drawing data indicated by a source pointer; transferring read drawing data to a destination of drawing data indicated by a destination pointer; detecting whether drawing data to be transferred has been transferred by a data length indicated by a data length; and according to a result of the step of detecting, starting reading drawing data to be next drawn indicated by a next pointer.

Since the source pointer may indicate drawing data to be drawn, frames may share drawing data. Thus the amount of the drawing data may be reduced.

The present invention in a further aspect provides a graphics drawing device including: a renderer receiving graphics drawing data, for performing a drawing processing on the basis of the graphics drawing data; a memory access controller outputting an address designating a data table, reading the data table designating the graphics drawing data from a first memory area in response to an instruction of another device and reading the graphics drawing data to be supplied to the renderer from a second memory area in response to the data table.

Since the memory access controller reads the graphics drawing data to be supplied to the renderer from the second memory area in response to the data table, the memory access controller may supply the graphics drawing data to the renderer at high speed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First embodiment

Figure 1:
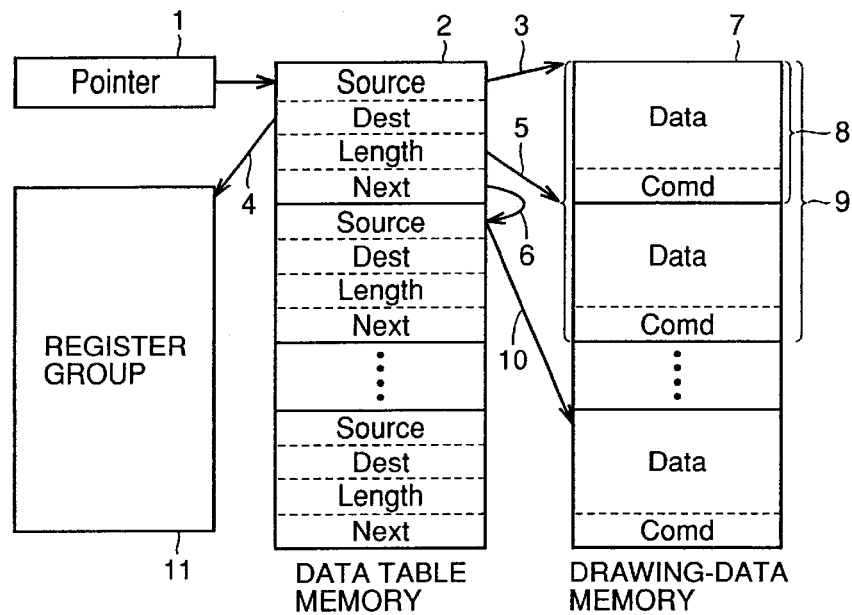
FIG. 1 is a diagram for illustrating a data structure of 3D graphics drawing data in a first embodiment of the present invention.

FIG. 1 shows a data structure of 3D graphics drawing data in a first embodiment of the present invention. The 3D graphics drawing data is configured of data in a data table stored in a data table memory 2, and drawing data stored in a drawing data memory 7.

The data table stored in data table memory 2 includes a source pointer (Source) 3 indicating a first address in drawing data memory 7 at which is stored single or a set of drawing data, a destination pointer (Dest) 4 indicating a destination of drawing data read from drawing data memory 7 that is to be transferred, a data length (Length) 5 indicating a data length of single or a set of drawing data successively read from drawing data memory 7, and a next pointer (Next) 6 indicating the next drawing data required for drawing an image for a frame.

Drawing data memory 7 stores a plurality of drawing data 8, each including polygon data (Data) and a command (Comd), configuring an object to be drawn.

Figure 2:
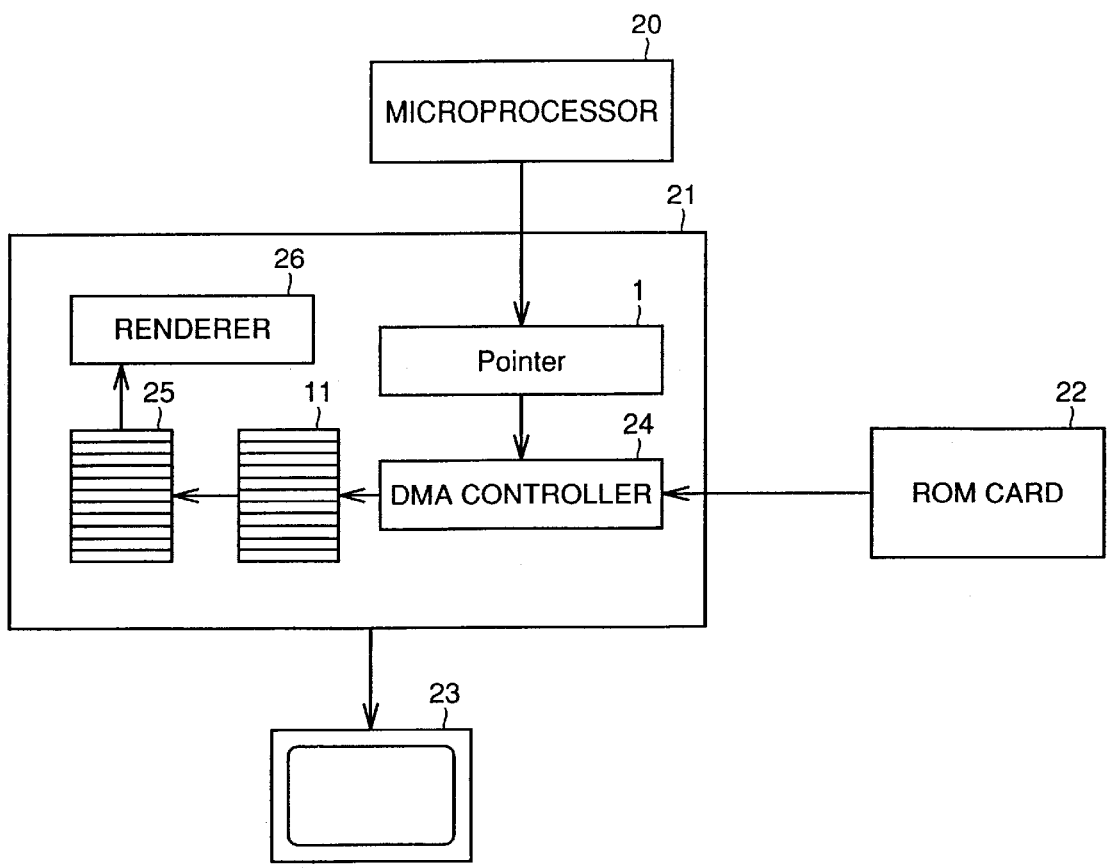
FIG. 2 is a block diagram schematically showing a configuration of a graphics device processing 3D graphics drawing data in the first embodiment of the present invention.

FIG. 2 is a block diagram schematically showing a configuration of a graphics device which processes 3D graphics drawing data in the present embodiment. The graphics device includes a microprocessor 20, a 3D graphics drawing device 21 interpreting drawing data and drawing 3D graphics, a read only memory (ROM) card 22 provided with data table memory 2 and drawing data memory 7, and a display device 23 displaying 3D graphics drawn.

3D graphics drawing device 21 includes a pointer 1, groups of registers 11 and 25, a direct memory access (DMA) controller 24, and a renderer 26 using drawing data to draw 3D graphics on display device 23.

Microprocessor 20 issues an instruction to draw an image for a frame, which is input pointer 1. Pointer 1 indicates a data table corresponding to an object to be drawn. When pointer 1 indicates a data table, a drawing process starts.

The group of registers 11 receives the polygon data and command that DMA controller 24 reads from drawing data memory 7. If the transferred command directs drawing data then the polygon data and command transferred to the group of registers 11 are transferred to the group of registers 25. Renderer 26 interprets the polygon data and command transferred to the group of registers 25 and draws on display device 23 a polygon forming an object to be drawn.

Figure 3:
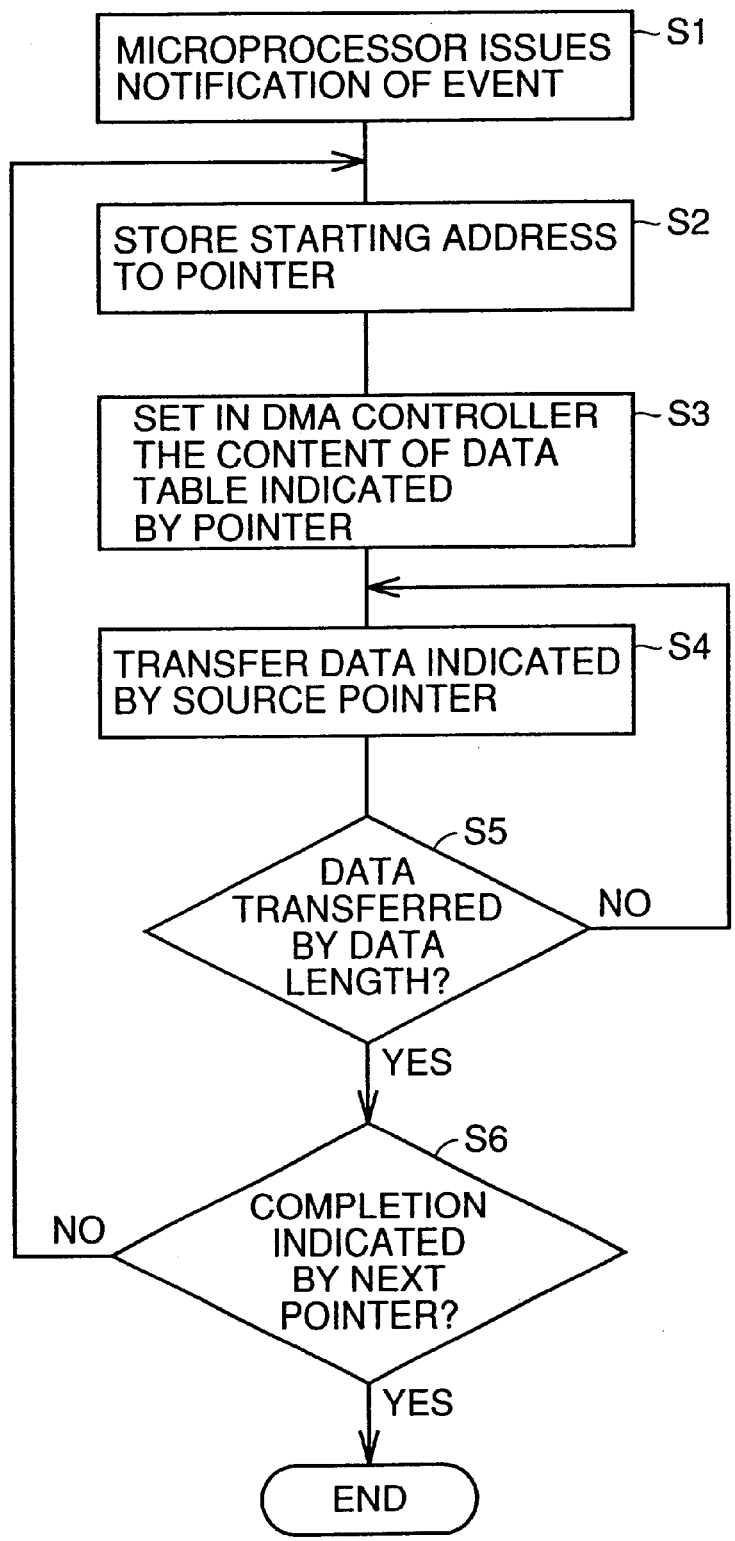
FIG. 3 is a flow chart of a method of processing 3D graphics drawing data in the first embodiment of the present invention.

FIG. 3 is a flow chart of a method of processing the 3D graphics drawing data shown in FIG. 1. Initially, microprocessor 20 issues a notification of an event (S1). Responsively, a starting address corresponding to the notification of the event is written to pointer 1 (S2). This address is a starting address of a data table corresponding to an object to be drawn.

The contents of the data table indicated by the starting address written to pointer 1, i.e., source pointer 3, destination pointer 4, data length 5 and next pointer 6 are transferred to a register provided in DMA controller 24 (S3). DMA controller 24 then starts DMA-transferring the polygon data and command indicated by source pointer 3 to successively transfer the same to the group of registers 11 (S4).

Then DMA controller 24 determines whether DMA transfer is performed by a data length (S5). If not (NO at S5) then the next polygon data and command indicated by next pointer 6 are DMA-transferred. If so (YES at S5) then control determines whether next pointer 6 indicates that the DMA transfer of interest is completed (S6).

If not and next pointer 6 indicates the next polygon data (NO at S6) then source pointer 3, destination pointer 4, data length 5 and next pointer 6 are transferred to a register provided in DMA controller 24 (S3) and the subsequent steps are repeated. If next pointer 6 indicates that the DMA transfer of interest is completed (YES at S6) then the process is completed.

Thus in a 3D graphics drawing device of the present embodiment, a drawing object duplicated or a set of drawing objects duplicated is not provided for drawing the object, but a data table stored in data table memory 2 is allowed to indicate drawing data stored in drawing data memory 7. Therefore, frames are permitted to share the drawing data to reduce the amount of the drawing data.

Furthermore, next pointer 6 allows drawing discontinuous drawing data, and using a shared table if shared drawing data is used in drawing different scenes.

While in the present embodiment data table memory 2 and drawing data memory 7 are provided in ROM card 22, they may be alternatively provided for example in a random access memory (RAM) card, a compact disc read only memory (CD-ROM) or any other similar, external storage media.

As has been described above, the present embodiment provides a 3D graphics drawing device using a data table indicating drawing data stored in drawing data memory 7, to allow frames to share the drawing data to reduce the amount of drawing data required for drawing an image. Thus drawing data may be stored in an external storage medium significantly reduced in capacity.

Furthermore, it is not necessary to perform a geometric operation for each frame. This can reduce the burden on the geometric-operation unit. Thus the geometric-operation unit may have relatively low processing ability. Thus the cost of the 3D graphics drawing device can be reduced.

Second Embodiment

Figure 4:
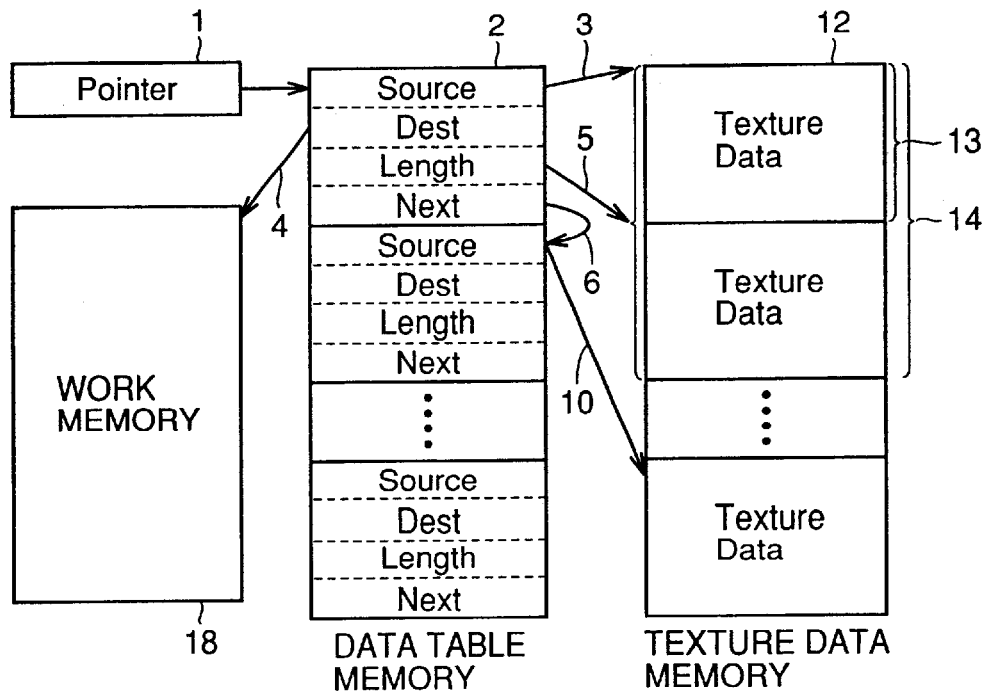
FIG. 4 is a diagram for illustrating a data structure of 3D graphics drawing data in a second embodiment of the present invention.

FIG. 4 illustrates a data structure of 3D graphics drawing data in a second embodiment of the present invention. This data is configured of data in a data table stored in data table memory 2, and texture data stored in a texture data memory 12.

The data table in data table memory 2 includes a source pointer (Source) 3 indicating a first address in texture data memory 12 at which is stored single or a set of texture data, a destination pointer (Dest) 4 indicating a destination of texture data read from texture data memory 12 that is to be transferred, a data length (Length) 5 indicating a data length of single or a set of texture data read successively from texture data memory 12, and a next pointer (Next) 6 indicating the next texture data required for drawing an image for a frame.

Texture data memory 12 stores a plurality of texture data 13.

The present embodiment provides a graphic device processing 3D graphics drawing data which is identical to the FIG. 2 graphics device of the first embodiment. Thus it will not be described in detail. It should be noted, however, that DMA controller 24 is adapted to read texture data from texture data memory 12 provided in ROM card 22 and transfer the read texture data to a work memory 18.

The present embodiment provides a method of processing 3D graphics drawing data which is identical to the FIG. 3 method in the first embodiment. Thus it will not be described in detail. It should be noted, however, that in FIG. 3 at step S4, texture data 14 stored in texture data memory 12 is DMA-transferred.

As such, rather than having texture data duplicated to provide the data for each frame, texture data memory 12 may store the texture data and the data table in data table memory 2 may indicate the texture data to permit frames to share the texture data to reduce the amount of the texture data.

Furthermore, next pointer 6 allows drawing discontinuous texture data, and using a shared table if shared texture data is used in drawing different scenes.

While in the present embodiment data table 2 and texture data memory 12 are provided in ROM card 22, they may be alternatively provided for example in a random access memory (RAM) card, a compact disc read only memory (CD-ROM) or any other similar, external storage media.

As has been described above, the present embodiment provides a 3D graphics drawing device using a data table indicating texture data stored in texture data memory 12, to allow frames to share the texture data to reduce the amount of texture data required for drawing an image. Thus texture data may be stored in an external storage medium significantly reduced in capacity.

Third Embodiment

Figure 5:
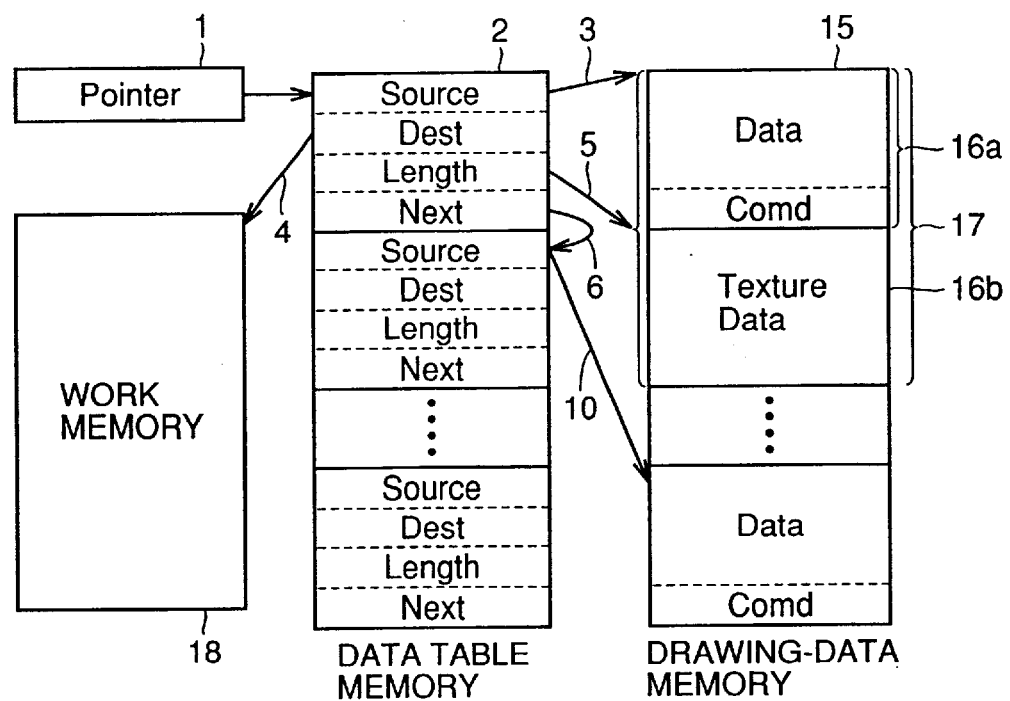
FIG. 5 is a diagram for illustrating a data structure of 3D graphics drawing data in a third embodiment of the present invention.

FIG. 5 shows a data structure of 3D graphics drawing data in a third embodiment of the present invention. The 3D graphics drawing data is configured of data in a data table stored in a data table memory 2, and drawing data and texture data stored in a drawing data memory 15.

The data table stored in data table memory 2 includes a source pointer (Source) 3 indicating a first address in drawing data memory 15 at which are stored single or a set of drawing data and single or a set of texture data, a destination pointer (Dest) 4 indicating a destination of the drawing data and texture data read from drawing data memory 15 that are to be transferred, a data length (Length) 5 indicating a data length of the drawing data and texture data read successively from drawing data memory 15, and a next pointer (Next) 6 indicating the next drawing data and texture data required for drawing an image for a frame.

Drawing data memory 15 stores a plurality of 3D graphics drawing data 17 including drawing data 16a comprised of polygon data (Data) and commands (Comd), and texture data 16b. A plurality of drawing data 16a and texture data 16b configure an object to be drawn.

The present embodiment provides a graphic device processing 3D graphics drawing data which is identical to the FIG. 2 graphics device of the first embodiment. Thus it will not be described in detail. It should be noted, however, that DMA controller 24 is adapted to read drawing data from drawing data memory 15 provided in ROM card 22 and transfer the read drawing data to the group of registers 11 also provided in 3D graphics drawing device 21 and read texture data from drawing data memory 15 and transfer the read texture data to work memory 18.

The present embodiment provides a method of processing 3D graphics drawing data which is identical to the FIG. 3 method in the first embodiment. Thus it will not be described in detail. It should be noted, however, that in FIG. 3 at step S4, drawing data 16 and texture data 17 stored in drawing data memory 15 are DMA-transferred.

Thus in a 3D graphics drawing device of the present embodiment, a drawing object duplicated or a set of drawing objects duplicated is not provided for drawing the object, but a data table stored in data table memory 2 is allowed to indicate drawing data stored in drawing data memory 15. Therefore, frames are permitted to share the drawing data to reduce the amount of the drawing data.

Furthermore, rather than having texture data duplicated to provide the data for each frame, texture data 16b stored in drawing data memory 15 may be transferred after drawing data 16a is transferred. As such, frames may share texture data. Thus the amount of texture data can be reduced.

While in the present embodiment data table memory 2 and drawing data memory 15 are provided in ROM card 22, they may be alternatively provided for example in a random access memory (RAM) card, a compact disc read only memory (CD-ROM) or any other similar, external storage media.

As has been described above, the present embodiment provides a 3D graphics drawing device using a data table indicating drawing data stored in drawing data memory 15, to allow frames to share the drawing data to reduce the amount of drawing data required for drawing an image. Thus drawing data may be stored in an external storage medium significantly reduced in capacity.

Furthermore, it is not necessary to perform a geometric operation for each frame. This can reduce the burden on the geometric-operation unit. Thus the geometric-operation unit may have relatively low processing ability. Thus the cost of the 3D graphics drawing device can be reduced.

Furthermore, transferring texture data 16b stored in drawing data memory 15 after drawing data 16a is transferred, allows frames to share the texture data to reduce the amount of texture data required for drawing an image. Thus texture data may be stored in an external storage medium significantly reduced in capacity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable recording medium, comprising:
   a plurality of graphics drawing data and a data table indicating graphics drawing data of said plurality of graphics drawing data that is to be transferred, said data table including a source pointer indicating a starting address of the graphics drawing data to be transferred,
   a destination pointer indicating a destination of the graphics drawing data to be transferred, and
   a data length of the graphics drawing data to be transferred, wherein said data table further includes a next pointer designating a data table indicating graphics drawing data to be next transferred.

2. The computer-readable recording medium according to claim 1, wherein said graphics drawing data includes a command directing a drawing processing to the graphics drawing device data.

3. The computer-readable recording medium according to claim 1, wherein each of said plurality of graphics drawing data includes texture data.

4. The computer-readable recording medium according to claim 1, wherein each of said plurality of graphics drawing data includes polygon data of an object to be drawn.

5. A computer-readable recording medium comprising:
   a plurality of graphics drawing data table indicating graphics drawing data of said plurality of graphics drawing data that is to be transferred, said data table including a source pointer indicating a starting address of the graphics drawing data to be transferred,
   a destination pointer indicating a destination of the graphics drawing data to be transferred,
   data length of the graphics drawing data to be transferred, and
   one or more other data tables each indicating one of said plurality of graphics drawing data, wherein
   each of the data table and said one or more other data tables includes a next pointer, and
   one of said next pointers included in one of the data table and said one or more other data tables indicates a completion of data transfer and said one or more next pointers included in the remainder each indicates another data table among the data table and said one or more other data tables.

6. A method of successively drawing desired drawing data of a plurality of drawing data, comprising the steps of:
   reading drawing data from a starting address of drawing data indicated by a source pointer;
   transferring said read drawing data to a destination of drawing data indicated by a destination pointer;
   detecting whether drawing data to be transferred has been transferred by a data length; and
   according to a result of the step of detecting, starting reading drawing data indicated by a next pointer that is to be next drawn.

7. The method according to claim 6, further comprising the step of extracting a command included in said read drawing data and directing drawing an image, and directing starting drawing the drawing data.

8. A graphics drawing device comprising:
- a renderer receiving graphics drawing data, for performing a drawing processing on the basis of said graphics drawing data;
- a memory access controller outputting an address designating a data table, reading the data table designating said graphics drawing data from a first memory area in response to an instruction of another device and reading said graphics drawing data to be supplied to said renderer from a second memory area in response to the data table.

9. The graphics drawing device of claim 8, wherein said data table includes a source pointer designating an address of the memory where said graphics drawing data is stored, a destination pointer designating a destination of said graphics drawing data, and a data length of said graphics drawing data.

10. The graphics drawing device of claim 8, wherein said data table includes a next pointer designating another data table, and said memory access controller reads said another data table from the first memory area in response to the next pointer and reads another graphics drawing data to be supplied to said renderer from the second memory area in response to said another data table.

11. The graphics drawing device of claim 10, wherein
said data table includes a source pointer designating an address of the memory where said graphics drawing data is stored, a destination pointer designating a destination of said graphics drawing data, and a data length of said graphics drawing data, and
said another data table includes a source pointer designating an address of the memory where said another graphics drawing data is stored, a destination pointer designating a destination of said another graphics drawing data, and a data length of said another graphics drawing data.

12. The graphics drawing device of claim 8, wherein
said first data table includes a next pointer, and said memory access controller determines in response to said next pointer, whether to read another data table designated by said next pointer from the second memory area or to complete access to the memory and reads another graphics drawing data to be supplied to said renderer from the second memory area in response to said another data table when reading said another data table.

13. The graphics drawing device of claim 8, wherein said graphics drawing data includes polygon data of an object to be drawn and a command directing drawing a polygon of the object.

14. The graphics drawing device of claim 8, wherein said graphics drawing data includes texture data.

* * * * *